United States Patent Office

Re. 27,426
Reissued July 11, 1972

27,426

LOW TEMPERATURE CURING NYLON-EPOXY-PHENOLIC ADHESIVE

James David Lincoln, Costa Mesa, and John F. Wasmund, San Clemente, Calif., assignors to Whittaker Corporation, Los Angeles, Calif.

No Drawing. Original No. 3,496,248, dated Feb. 17, 1970, Ser. No. 573,463, Aug. 19, 1966. Application for reissue Oct. 8, 1970, Ser. No. 79,303
Int. Cl. C08g *45/08*
U.S. Cl. 260—831 13 Claims

Matter enclosed in heavy brackets [ ] appears in the original patent but forms no part of this reissue specification; matter printed in italics indicates the additions made by reissue.

ABSTRACT OF THE DISCLOSURE

This patent describes a novel adhesive composition comprising an intimate homogeneous mixture of a nylon which is a polyamide formed from the reaction of hexamethylene diammonium adipate and hexamethylene diammonium sebacate with caprolactam, an epoxy resin which is a polyglycidyl ether of a polyhydric phenol, and a phenolic resin which is at least difunctional in phenolic hydroxyl groups prior to curing, said mixture being in the form of a film of substantially uniform thickness and weight per unit area.

In the past, high peel strength structural adhesives contained a blend of a very high molecular weight flexible polymer with a low melting thermosetting resin. Examples of such blends include vinyl-phenolic rubber, rubber phenolic and more recently nylon-epoxy resins. The high molecular weight, flexible portion of the blends contributed toughness and peel strength while the thermosetting component provided creep resistance and specific solvent resistance.

However, these materials possess several disadvantages. Thus, in order to make satisfactory joints, it was necessary to cure these materials at a temperature of 300° F. to 350° F. using pressures of 40 to 100 p.s.i., since high cure temperatures and pressures are necessary in order to cause the high molecular weight portion of these blends to flow and wet the adherends. High curing temperatures and pressures, though tolerable, cause many difficulties including weakening of aluminum alloys, high residual thermal stresses in complex structures, and high processing cost because of the expensive tooling fixtures and equipment required to bond structures at high temperature and pressure.

In contrast to the foregoing, the present invention provides a family of high peel strength structural adhesives which can be bonded at temperatures as low as 180° F. The novel structural adhesives of the present invention therefore will substantially avoid the various difficulties which have been observed to be present with the above-discussed adhesives of the prior art.

Thus, it is an object of this invention to provide a novel class of low temperature curing, high peel strength structural adhesives.

Another major object of the invention is to provide a method of obtaining a new low temperature curing, high peel strength structural adhesive.

More specifically, it is an object of the invention to provide novel epoxy-nylon-phenolic adhesives, as are more fully hereinafter described.

In a more analytic sense, it is an object of the invention to utilize the hydroxyl content of the phenolic resins as a thermal setting solvent for nylon epoxy adhesive systems.

These and other objects and advantages of this invention will be apparent from the more detailed description which follows.

Briefly, the present invention compriss a family of adhesive formulations containing nylon, epoxy resins, and phenolic resins. More particularly, the present invention comprises a novel adhesive formulation ordinarily containing from 5 to about 65 parts by weight nylon, from about 25 to about 70 parts by weight epoxy resin, and from 5 to about 35 parts by weight of phenolic resins, which are at least difunctional in phenolic hydroxyl groups. The present invention additionally includes the preparation of these novel adhesive formulations.

In this invention, it has been observed that the high molecular weight nylon contributes toughness while the epoxy-phenolic portion provides creep resistance and specific solvent resistance. While both nylon-epoxy and phenolic-epoxy combinations are common in the prior art, the combination of nylon-epoxy with phenolic resins is novel, and unexpectedly yields a structural adhesive which permits a significant lowering of cure temperatures due to the fact that the melt temperature, sometimes referred to as the wetting temperature, of the nylon is lowered by the presence of the phenolic-hydroxyl groups present in the phenolic resins. While not bound by any theory, it is believed that the phenolic resin is, in fact, a solvent for the nylon.

In general, it has been previously observed that solvents tend to degrade the properties of adhesive bonds. Thus, if a solvent is used to enhance wetting or lower melt temperature, it normally must be removed or else a weak non-structural joint will occur. It is believed that in the case of the novel nylon-epoxy-phenolic adhesives of the present invention, the phenolic solvent is removed after wetting occurs by copolymerization with the epoxy portion of the blend. Thus, the phenolic portion of the adhesives could be considered to be a thermal setting solvent.

The novel adhesives of the present invention are particularly adapted for both metal-to-metal and sandwich applications where high strength at temperatures from about −67° F. to 180° F. is required. It has been found that the low temperature cure of 250° F. minimizes corrosion of the aluminum parts, and prevents degradation of plastic and plastic tooling which normally occurs where high curing temperatures are required. Moreover, in the use of adhesives of the present invention, the cure temperature is not only lower but the curing time is reduced to almost half of that required by the higher curing adhesives of the prior art. Adhesives of the present invention provide still other savings by reducing autoclave times, lower processing times, and lower tooling costs. It has been found that the adhesives of the present invention provide excellent handleability and drapability for both metal-to-metal and sandwich applications. Typical applications for the novel adhesives of the present invention include radar transit cases, cryogenic bulkheads, helicopter rotor blades, wing and enpennage components, electrical components, wing tip bonding, speed brake doors, leading edges, trailing edges, and wing paneling.

In general, any of the phenol-aldheyde resins having at least two free phenolic hydroxyl groups in the uncured state may be combined with epoxy resins and nylon to form the novel adhesive material within the scope of the present invention. Thus, the phenol-aldehyde resins used in the present invention may be prepared from various phenols such as phenol, cresol, cathecol, xylenol, hydroquinone, resorcinol, phenyl phenol or butyl phenol, and various aldehydes, such as formaldehyde, and furfuraldehyde. The resins prepared primarily from phenol and formaldehyde are preferred. The phenol-aldehyde sins used in the present invention should be convertible an infusible solid insoluble state when heated. The eparation of phenolic resins containing at least two free ıenolic hydroxyl groups in the uncured state is already ıown to those skilled in the art, and need not be further tailed here.

The present invention is applicable to epoxy resins in ıneral. These epoxy resins are polyepoxide materials ıving a plurality of oxirane moieties, said polyepoxides ing derived from either the condensation of epichloro-drines and polyhydric phenols or from the reaction of racids and polyolefins. Typical epoxy resins include traglycidyl ethers of tetrakis(hydroxy-phenyl)ethane, ırious bisphenol-A (i.e., para, para'-isopropylidenadi-ıenol) based resins and the like. Typical of such epoxy sins are the epons, including Epon 828, Epon 1001, 07, 1031 and the like. These materials are generally the action product of bisphenol-A and epichlorohydrine ıving various epoxy equivalents. The term "curable oxy resins" as used herein and the claims, refers to any ıch resin such as above described which contains a suit-ıle curing agent and two prereacted resin systems. Pre-acted resin systems are described in assignee's copend-g application Ser. No. 828,355, filed July 20, 1959.

The preferred nylon for use in the present invention is ytel 61 comprising an ethyl alcohol/water mixture-luble nylon polyamide formed from the reaction of xamethylenediammonium adipate and hexamethylene-ammonium sebacate with caprolactam.

Various techniques may be utilized in the formulation adhesives in the present invention. However, it has en found that satisfactory adhesive films may be ob-ined by the use of a solution casting process. In this ocess, a nylon is dissolved in a suitable solvent and mbined with a solvent solution of epoxy resin and ıenolic aresin with vigorous mixing. The resulting mix-re is a suspension or colloidal solution. The solution is ated to drive off a portion of the solvents and to in-ease the weight percent solids contained to approxi-ıately 40% to 70%. At this point the solution may be ıst by any of the methods known to the art onto a suit-ıle backing material and dried. The dried strip is a omogeneous mixture of nylon-epoxy resin-phenolic resin. he dried strip may then be rolled up and stored. When is desired to use the strip it is rolled out and placed etween the adherends. Thereafter the material is cured as ore fully hereinafter described.

Prior to the application of the adhesives of this inven-on to the surface to be joined, the surfaces may be ptionally cleaned. For example, the bonding surfaces of rought aluminum and aluminum alloys may be cleaned y the use of solvents such as by rubbing with a solvent aked clean rag. Methyl ethyl ketone is normally suitable r removing the ink markings from aluminum and uminum alloy surfaces. The parts to be joined may also vapor degreased in trichloroethylene by suspension in trichloroethylene vapor zone until the vapor is no longer ondensed on the surface. Exceptionally dirty parts may flushed with clean trichloroethylene liquid and cooled ior to vapor degreasing. Clad aluminum alloys and loys with bare bonding surfaces and clad exterior can cleaned by immersing for about 20 minutes at 150° F. 160° F. in a solution of thirty parts by weight distilled de-ionized water, ten parts by weight concentrated sul-iric acid and four parts by weight sodium dichromate. hereafter, all surfaces can be thoroughly flooded with nse water. Normally, the cleaned surfaces are air dried y placing in a rack. The draining of the water from the rfaces prevents water stains which might weaken the bsequent adhesive bond. Drying may be facilitated by ying in an air circulating oven at not over 150° F. arious other cleaning techniques already familiar to ose skilled in the art may be utilized to prepare the herends for adhesion in accordance with the utilization the novel adhesives of the present invention.

In some cases it has been found that the adhesion is further improved by first applying a primer to the adherends. It should be understood that a primer coat is not required in the practice of the present invention, although a primer does improve joint strength after exposure to high humidity and salt spray. The primer also provides a high heat tack surface for the adhesive. If the primer is desired, the primer is normally applied by spraying, brushing or dipping, to a thickness of about 0.005 to 0.0003 inch, followed by air drying for a period of about 30 minute at 130° F. to 1 hour at room temperature. Typical primer solution which has been found to be suitable is Narmco Liquid Primer 2250.

The adhesive film prepared by the casting technique above-described is prepared for layup in a variety of ways, such as by removing the adhesive roll from storage, normally from the refrigerator, and allowing the roll to come to room temperature. Preferably, the roll is maintianed during storage in a sealed polyfilm bag to prevent moisture condensation on the adhesive film. After the adhesive has been removed from storage and brought to room temperature, the polyfilm bag is unsealed. A section of the adhesive is cut from the roll to the proper size. If tack is desired, and the metal adherends are primed, they can be heated to 150–160° F. to hold the adhesive film in place. In any event, after the adhesive is cut to the desired size, the adhesive is laid on the adherend that will form one side of the finished layup. The completed assembly is normally bonded at a pressure of about 40 p.s.i. pressure being applied by suitable means such as press, autoclave, pressure diaphragm or vacuum bag.

The curing procedure followed after the layup has been prepared generally as follows. The cure should start within two to five days after the adhesive film has been removed from storage. Sandwich construction should be bonded within three days, while metal-to-metal joints are best bonded after five to seven days at room temperature. It has been found that good results are obtained when the cure is effected as follows:

| Temperature | Time | Pressure |
|---|---|---|
| 250° F. | 90 min. | 40 p.s.i. |
| 275° F. | 40 min. | 15–100 p.s.i. |
| 300° F. | 15 min. | 15–100 p.s.i. |

The following example is presented solely to illustrate the invention and should not be regarded as limiting in any way. In the example the parts and percentage are by weight unless otherwise indicated.

Example

The casting solution was prepared by dissolving 5839.7 grams of Zytel 61 in 8936 grams of ethyl alcohol and 3825 grams of ethylene dichloride in an agitated 8 gallon reactor at 158° F. After about sixty minutes the nylon solution was cooled to 130° F. Meanwhile, to still another 8 gallon reactor there was added 50 pounds of resorcinol. The resorcinal was heated with 100 p.s.i. steam until the resorcinol melted. Thereafter, the agitator on the reactor was started. Then, 7567 grams of GE 715108 resin was added and the contents of the reactor maintained at about 250° F. for about thirty minutes. GE 715108 is a phenolic which is a mixture of allyl ethers of mono, di and tri methylol phenols. The solution was cooled to 150° F. and 1400 grams thereof were added to the reactor containing the nylon solution. Then 4329 grams of ERLA 0510 (triglycidyl ether of paraaminophenol), an epoxy resin, was added. Then 539 grams of an epoxy solution containing 1200 parts titanium dioxide pigment to impart opacity and hide blemishes, 200 parts of ethylene dichloride, and 600 parts of the triglycidyl ether of paraaminophenol was added and the entire solution thoroughly mixed and cooled to about 90° F. and cast into films within about sixty minutes after reaching 90° F. The films were then permitted to dry. Thereafter, the adhesive films were stored in a refrigerator in a polyfilm bag. Several days later, the adhesive films in the polyfilm bags were removed from the refrigerator and permitted to come to room temperature. Thereafter, layups were prepared from the adhesives in the manner above-described. The cure temperature was 250 and the cure pressure 40 p.s.i. for ninety minutes. The mechanical properties of the joined adherends employing the adhesive of this example are set forth in the following table:

TABLE

| Property | Unit | Test temp. (° F.) | Results | |
|---|---|---|---|---|
| | | | No prime | Prime |
| Tensile shear strength | P.s.i. | RT | 6,500 | 6,700 |
| Tensile shear strength | P.s.i. | 180 | 3,500 | 3,800 |
| Tensile shear strength | P.s.i. | 250 | 1,200 | 1,400 |
| Tensile shear strength | P.s.i. | −67 | 5,200 | 4,900 |
| Tensile shear strength: | | | | |
| 30-days salt spray | P.s.i. | RT | 3,900 | 4,400 |
| 30-days in tap water | P.s.i. | RT | 5,600 | 5,900 |
| 7-days in anti-icing fluid (Mil-F-5506). | P.s.i. | RT | 6,250 | 6,100 |
| 7-days in hydraulic oil (Mil-F-5606). | P.s.i. | RT | 6,750 | 6,450 |
| 7-days in JP-4 fuel (Mil-O-5624). | P.s.i. | RT | 6,800 | 6,650 |
| 7-days in hydrocarbon fluid | P.s.i. | RT | 6,200 | 6,000 |
| 30-days condensing humidity 100% R.H. at 120° F. | P.s.i. | RT | 3,600 | 4,100 |
| Metal-to-metal "T" peel (0.020") 2024T-3 clad alum. | Lb./in. | RT | 45 | 45 |
| Sandwich peel strength (Mil-A-25463 substrates). | In. lb./in. width | RT | 45 | 45 |

It will be understood that many variations are possible within the scope of the present invention. Accordingly, it is intended that the invention be limited only by the lawful scope of the appended claims.

What is claimed is:

1. An adhesive composition comprising an intimate homogeneous mixture of an ethyl alcohol/water-mixture soluble nylon which is a polyamide formed from the reaction of hexamethylene diammonium adipate and hexamethylene diammonium sebacate with caprolactam, an epoxy resin which is a polyglycidyl ether of a polyhydric phenol, and a phenolic aldehyde resin which is at least difunctional in phenolic hydroxyl groups prior to curing, said composition containing from 5 to about 65 parts by weight nylon, from about 25 to about 70 parts by weight epoxy and from 5 to about 35 parts by weight of aldehyde phenolic resin and said mixture being in the form of a film of substantially uniform thickness and weight per unit area.

2. The adhesive composition of claim 1 in which said mixture includes resorcinol.

3. An adhesive material comprising an intimate homogeneous mixture of an ethyl alcohol/water-mixture soluble nylon which is a polyamide formed from the reaction of hexamethylene diammonium adipate and hexamethylene diammonium sebacate with caprolactam, a curable epoxy resin which is a polyglycidyl ether of a polyhydric phenol, and a curable phenolic aldehyde resin which is at least difunctional in phenolic hydroxyl groups prior to curing, said composition containing from 5 to about 65 parts by weight nylon, from about 25 to about 70 parts by weight epoxy and from 5 to about 35 parts by weight of said phenolic resin.

4. The method of forming an adhesive which comprises the steps of admixing in a solvent an ethyl alcohol/water-mixture soluble nylon which is a polyamide formed from the reaction of hexamethylene diammonium adipate and hexamethylene diammonium sebacate with caprolactam, an epoxy resin which is a polyglycidyl ether of a polyhydric phenol, and a phenolic aldehyde resin which is at least difunctional in phenolic hydroxyl groups prior to curing said composition containing from 5 to about 65 parts by weight nylon, from about 25 to about 70 parts by weight epoxy and from 5 to about 35 parts by weight of said phenolic resin and thereafter coating said solvent containing said nylon, epoxy resin and phenolic resin on a base, and permitting the solvent to evaporate.

5. A method of forming a fused adhesive film, the steps comprising admixing in a solvent an ethyl alcohol/water-mixture soluble nylon which is a polyamide formed from the reaction of hexamethylene diammonium adipate and hexamethylene diammonium sebacate with caprolactam, an epoxy resin which is a polyglycidyl ether of a polyhydric phenol, and a phenolic aldehyde resin which is at least difunctional in phenolic hydroxyl groups prior to curing said composition containing from 5 to about 65 parts by weight nylon, from about 25 to about 70 parts by weight epoxy and from 5 to about 35 parts by weight of said phenolic resin and coating said solution on a base, permitting said solvent to evaporate, and subjecting said resulting film to heat and pressure to yield a fused adhesive.

6. The combination of claim 1 wherein the phenolic resin is a phenol-formaldehyde resin.

7. The composition of claim 1 wherein the epoxy resin is a polyepoxide from the condensation of epichlorohydrins with polyhydric phenols.

8. A composite structure comprising two metal parts joined by adhesive composition comprising an intimate homogeneous mixture of an ethyl alcohol/water-mixture soluble nylon which is a polyamide formed from the reaction of hexamethylene diammonium adipate and hexamethylene diammonium sebacate with a caprolactam, an epoxy resin which is a polyglycidyl ether of a polyhydric phenol, and a phenolic aldehyde resin which is at least difunctional in phenolic hydroxyl groups prior to curing, said composition containing from 5 to about 65 parts by weight nylon, from about 25 to about 70 parts by weight epoxy and from 5 to about 35 parts by weight of said phenolic resin and said mixture being in the form of a film of substantially uniform thickness and weight per unit area.

9. The method of claim 4 wherein the phenolic resin is a phenol-formaldehyde resin.

10. The method of claim 4 wherein the epoxy resin is a polyepoxide from the condensation of epichlorohydrins with polyhydric phenols.

*11. An adhesive composition comprising an intimate homogeneous mixture of (a) a curable epoxy resin which is a polyglycidyl ether of a polyhydric phenol, (b) a curable phenolic-aldehyde resin which is at least difunctional in phenolic hydroxyl groups prior to curing, and (c) a polyamide having repeating carbonamide groups as an integral part of the linear polymeric chain and which is soluble in said curable phenolic-aldehyde resin, said composition containing from about 25 to about 70 parts by weight of (a), about 5 to about 35 parts by weight of (b), and about 5 to about 65 parts by weight (c).*

*12. The adhesive composition of claim 11 wherein said ırable phenolic-aldehyde resin is a phenol-formaldehyde 'sin.*

*13. The adhesive composition of claim 12 wherein said ırable epoxy resin is a polyepoxide from the condensa- on of epichlorohydrins with polyhydric phenols.*

References Cited

The following references, cited by the Examiner, are ſ record in the patented file of this patent or the original ıtent.

UNITED STATES PATENTS

| | | | |
|---|---|---|---|
| 3,159,499 | 12/1964 | Jorda | 260—831 |
| 3,344,118 | 9/1967 | Smith | 260—831 |
| 3,363,025 | 1/1968 | Fitko | 260—831 |
| 3,379,561 | 4/1968 | Manaka | 260—831 |

PAUL LIEBERMAN, Primary Examiner

U.S. Cl. X.R.

260—47 EP, 830 P